United States Patent
Steckelberg et al.

(10) Patent No.: US 6,391,066 B1
(45) Date of Patent: May 21, 2002

(54) DYE MIXTURE COMPRISING WATER-SOLUBLE FIBER-REACTIVE DYES, PREPARATION THEREOF AND USE THEREOF

(75) Inventors: Joachim Steckelberg, Hofheim; Ronald Pedemonte, Eppstein-Vockenhausen, both of (DE)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/511,043

(22) Filed: Feb. 23, 2000

(51) Int. Cl.⁷ .................... C09B 67/24; D06P 1/382; D06P 1/384

(52) U.S. Cl. .............................. 8/549; 8/641
(58) Field of Search ..................... 8/549, 641

(56) References Cited

U.S. PATENT DOCUMENTS

| | | |
|---|---|---|
| 5,428,141 A | 6/1995 | Herd et al. .................. 534/638 |
| 5,821,347 A | * 10/1998 | Dannheim |
| 5,831,038 A | 11/1998 | Reichert ..................... 534/612 |
| 5,892,006 A | 4/1999 | Tzikas ......................... 534/634 |
| 6,090,164 A | 7/2000 | Steckelberg et al. ........... 8/549 |

FOREIGN PATENT DOCUMENTS

| | | |
|---|---|---|
| DE | 41 40 117 | 1/1993 |
| EP | 94055 | * 11/1983 |
| EP | 144766 | * 6/1985 |
| EP | 478 503 | 4/1992 |
| EP | 625 551 | 11/1994 |
| EP | 775 732 | 5/1997 |
| EP | 957 137 | 11/1999 |

* cited by examiner

*Primary Examiner*—Margaret Einsmann
(74) *Attorney, Agent, or Firm*—Connolly Bove Lodge & Hutz LLP

(57) ABSTRACT

Dye mixture comprising water-soluble fiber-reactive dyes, preparation thereof and use thereof The present invention relates to dye mixtures comprising one or more azo dyes of the general formula (1) and one or more azo dyes of the general formula (2)

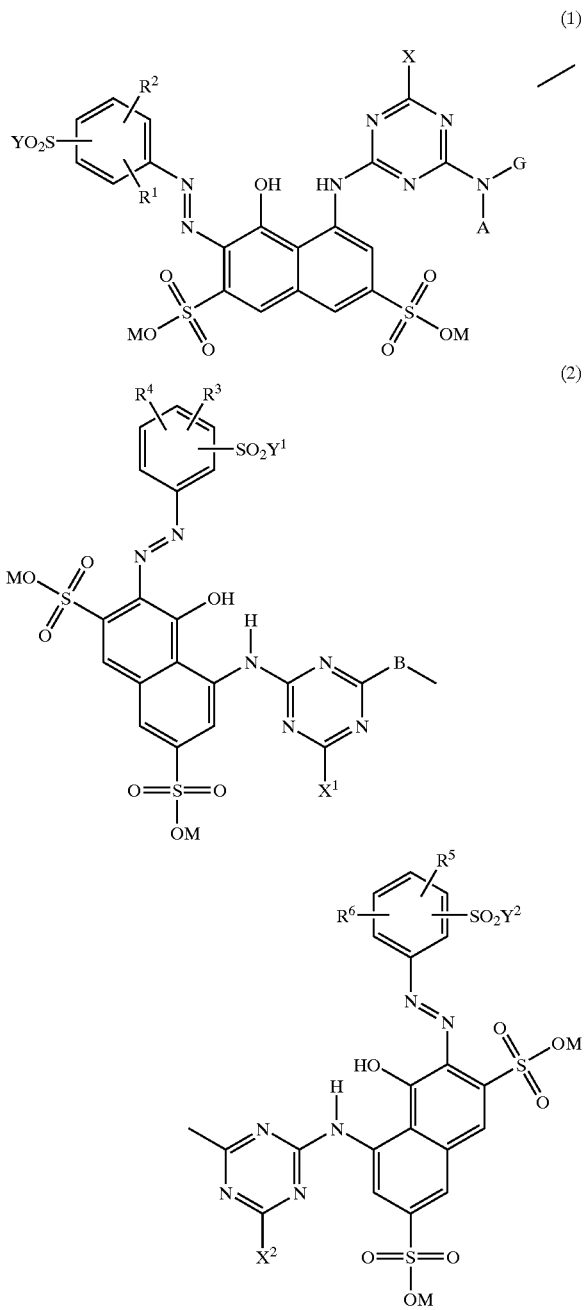

where the variables are each as defined in claim 1, processes for preparing them and their use for dyeing and printing hydroxyl- and/or carboxamido-containing material.

12 Claims, No Drawings

DYE MIXTURE COMPRISING WATER-SOLUBLE FIBER-REACTIVE DYES, PREPARATION THEREOF AND USE THEREOF

This invention relates to the technical field of fiber-reactive azo dyes.

Dyes conforming to the hereinbelow indicated general formulae 1 and 2 are known from EP-A 94055, EP-A 144766 and EP-A 775732. However, these dyes have certain application defects, for example an excessive dependence of the color yield on changing dyeing parameters in the dyeing process, or an insufficient or unlevel color build-up on cotton (good color build-up follows from the ability of a dye to produce a correspondingly stronger dyeing from an increased dye concentration in the dyebath). Possible consequences of these shortcomings are poor reproducibilities for the dyeings which are obtainable.

However, it is particularly important to obtain dyeings having a good color yield, i.e., dyeings whose depth of shade is very high in relation to the amount of dye used, for example in comparison with other dyes, because of the coloring property of the dye itself (high absorbance) and because of the dyeing characteristics of this dye, such as good affinity and high yield of fixation. If mixtures of dyes having a certain color yield are used, the color yield of this mixture of dyes will generally be the average of the color yields of the individual dyes, which is why the color yield of a mixture of, for example, two dyes will be less than the color yield obtained when the dye having the larger color yield property is used as the only dye but in the total amount of the two individual dyes.

It has now been found that the color strength of the hereinbelow described dye mixtures according to the invention is surprisingly higher than the sum total of the color strengths afforded by the individual dyes in the mixture. This synergistic effect also shows itself in improved build-up characteristics on the part of the mixture of the invention compared with the individual dyes in the mixture.

It is true that synergistic mixtures of certain reactor dyes are already known from EP-A 681002, but the mixtures described therein have certain application defects, for example an unlevel build-up in the cold pad-batch process, and also the staining of adjacent fabric, especially polyester, in continuous dyeing by the pad-steam process. This staining is undesirable because it means that, in commercial practice, the dyed material has to be subjected to several energy- and media-intensive (water) cleaning operations to remove the stains. The present invention also provides a way of reducing this staining while improving the build-up characteristics of the mixture according to the invention compared with the individual dyes in the mixture.

The present invention accordingly provides dye mixtures comprising one or more azo dyes of the general formula (1) and one or more azo dyes of the general formula (2)

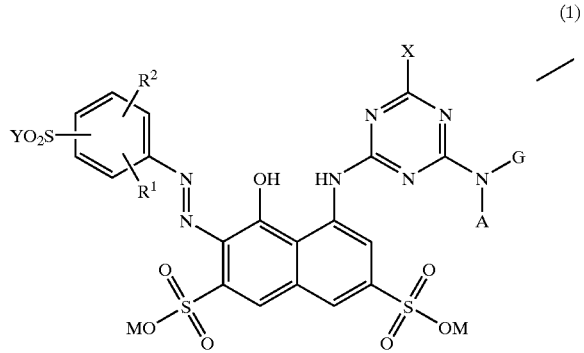

(1)

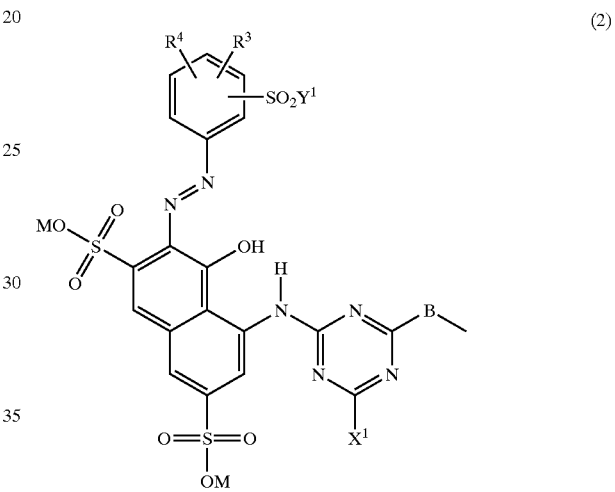

(2)

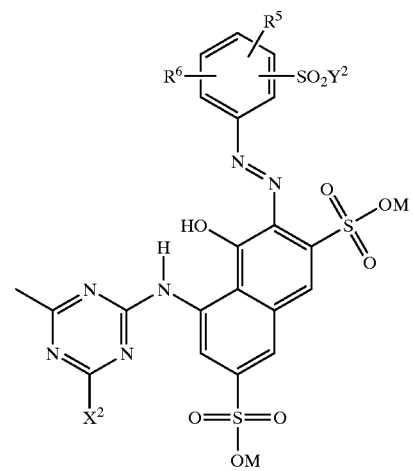

where
M is an alkali metal, an ammonium or the equivalent of an alkaline earth metal;
X, $X^1$ and $X^2$ are independently fluoro, chloro, alkoxy, hydroxyl, cyanamido, amino, anilino, sulfoanilino or alkylamino;
Y, $Y^1$ and $Y^2$ are independently ethenyl or a grouping of the formula —$CH_2CH_2Z$, where
Z is an alkali-eliminable grouping;

$R^1$, $R^2$, $R^3$, $R^4$, $R^5$ and $R^6$ are independently hydrogen, alkyl, alkoxy, sulfo, hydroxyl, cyano, chloro or bromo;

B is an alkylenediamino bridge of the general formula D or E or F

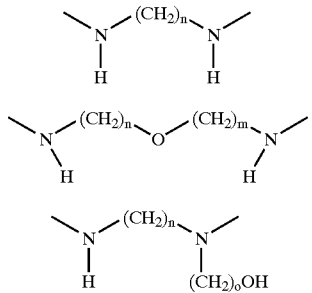

where n, m and o are independently from 1 to 4;

A and G combine with the joining nitrogen atom to form a morpholine or piperazine radical; or A is hydrogen, ($C_1$–$C_4$)-alkyl, which may be substituted, phenyl or phenyl substituted by alkyl, alkoxy, sulfo, hydroxyl, cyano, chloro or bromo; and G has one of the meanings of A or is a fiber-reactive radical of the general formula H, I or J

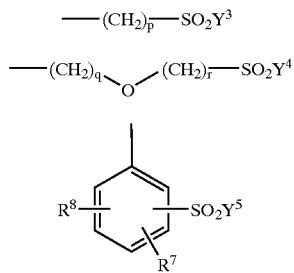

t where p, q and r are independently from 1 to 4;

$Y^3$, $Y^4$ and $Y^5$ independently have one of the meanings of $Y^1$; and $R^7$ and R8 are independently hydrogen, alkyl, alkoxy, sulfo, hydroxyl, cyano, chloro or bromo.

Alkyl R and any alkyl substituent on phenyl A may be straight-chain or branched and be for example methyl, ethyl, n-propyl, i-propyl, n-butyl, i-butyl, sec-butyl, tert-butyl, pentyl or hexyl. Preference is given to ($C_1$–$C_4$)-alkyl groups, and methyl and ethyl are particularly preferred. Similarly, ($C_1$–$C_4$)-alkyl A is preferably methyl or ethyl.

The same logic rules for alkoxy groups, which are thus preferably ($C_1$–$C_4$)-alkoxy groups and particularly preferably methoxy and ethoxy, and also for alkylamine X. The latter is preferably ($C_1$–$C_4$)-alkylamine and particularly preferably methylamine or ethylamine.

Alkyl metal M is preferably sodium, potassium or lithium, particularly preferably sodium. The equivalent of an alkaline earth metal M is preferably the equivalent of calcium.

An alkali-eliminable grouping Z is, for example, chloro, acetyl, phosphato or preferably sulfato.

M is preferably sodium, i.e., the dyes in dye mixtures according to the invention are preferably in the form of their sodium salts. The X radicals are each preferably independently chloro or fluoro, and the Y radicals are each preferably ethenyl or β-sulfatoethyl. The groups —$SO_2Y$, —$SO_2Y^1$ and —$SO_2Y^2$ are preferably disposed para relative to the diazo group. The —$SO_2Y^5$ group is preferably disposed para or meta relative to the amino group. $R^1$ to $R^8$ are each preferably independently hydroxyl, methyl, methoxy, sulfo and particularly preferably hydrogen. Most preferably $R^1$ to $R^8$ are all hydrogen. n, m, p, q and r are each preferably 2 or 3. B is for example 1,3- to 1,6-($C_3$–$C_6$)-alkylenediamino, 1,5-diamino-3-oxapentane, and is particularly preferably N-(2-hydroxyethyl)-ethylenediamino. A is preferably hydrogen, methyl or phenyl, while G is preferably 3-sulfophenyl, 3-(β-sulfatoethylsulfonyl)-phenyl or 3-(β-sulfatoethylsulfonyl)-propyl. Particularly preferably G is 2-(β-sulfatoethylsulfonyl)-ethyl or 4-(β-sulfatoethylsulfonyl)-phenyl.

In particularly preferred dye mixtures according to the invention, $R^1$ to $R^8$ are each hydrogen, the groups —$SO_2Y$, —$SO_2Y^1$ and —$SO_2Y^2$ are disposed para relative to the diazo group and Y, $Y^1$ and $Y^2$ are each ethenyl or β-sulfatoethyl, A is hydrogen, methyl or phenyl, X, $X^1$ and $X^2$ are each fluoro or chloro, and G is 2-(β-sulfatoethylsulfonyl)-ethyl, 4-(β-sulfatoethylsulfonyl)-phenyl or is a radical of the general formula I with q=r=2.

In general, the azo dye of the general formula (1) and the azo dye of the general formula (2) are present in the dye mixture of the invention in a blend ratio of 90:10% by weight to 10:90% by weight, preferably in a ratio of 70:30% by weight to 30:70% by weight. Particularly preferably they are present in the mixture in a ratio of 65:35 to 35:65% by weight.

The dye mixtures of the invention can be present as a preparation in solid or in liquid (dissolved) form. In solid form, they generally include the electrolyte salts customary for water-soluble and especially for fiber-reactive dyes, such as sodium chloride, potassium chloride and sodium sulfate, and may further include the auxiliaries customary in commercial dyes, such as buffer substances capable of setting a pH in aqueous solution between 3 and 7, such as sodium acetate, sodium borate, sodium bicarbonate, sodium dihydrogenphosphate, sodium tricitrate and disodium hydrogen phosphate, or small amounts of siccatives; if they are present in a liquid, aqueous solution (including the presence of thickeners of the type customary in print pastes), they may also include substances which ensure a long life for these preparations, for example mold preventatives.

In general, the dye mixtures of the invention are present as dye powders containing 10 to 80% by weight, based on the dye powder or the preparation, of an electrolyte salt which is also referred to as a standardizing agent. These dye powders may additionally include the aforementioned buffer substances in a total amount of up to 10% by weight, based on the dye powder. If the dye mixtures of the invention are present in aqueous solution, the total dye content of these aqueous solutions will be up to about 50% by weight, for example between 5 and 50% by weight, and the electrolyte salt content of these aqueous solutions will preferably be below 10% by weight, based on the aqueous solution; the aqueous solutions (liquid preparations) may include the aforementioned buffer substances in an amount which is generally up to 10% by weight, for example 0.1 to 10% by weight, preference being given to 2% by weight, especially 0.1 to 2% by weight.

The present invention also relates to the preparation of dye mixtures according to the invention. This may be effected in a conventional manner, by mechanically mixing the solid or liquid individual dyes of the general formulae 1 and 2 in the desired blend ratio. The requisite individual dyes of the general formulae 1 and 2 are known and can be prepared according to processes known per se, or else acquired commercially.

However, the dye mixtures according to the invention may also be obtained by direct synthesis. This may be effected by, in a conventional manner, reacting 1-amino-8-hydroxynaphthalene-3,6-disulfonic acid with cyanuric chloride or cyanuric fluoride, then with a mixture of one or more amines of the general formula Da, Ea or Fa

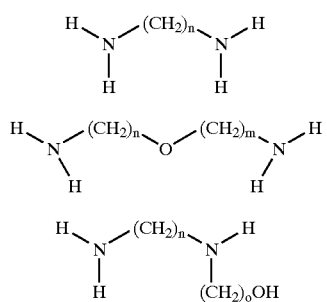

where n, m and o are each as defined above, and one or more amines of the general formula Ha, Ia or Ja

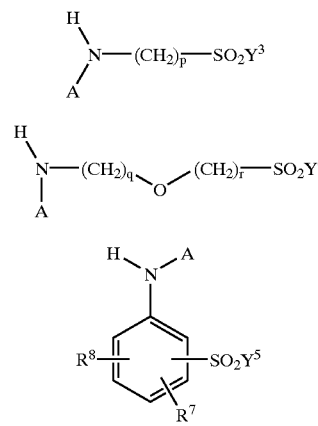

where p, r, A, $Y^3$, $Y^4$, $Y^5$, $R^7$ and $R^8$ are each as defined above, b) subsequently with a mixture of diazonium salts of the amines of the general formulae (3), (4) and (5)

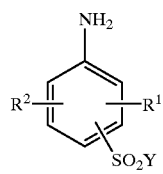

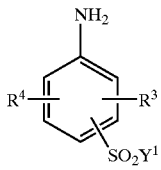

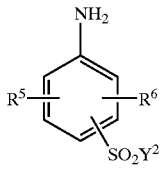

where $R^1$, $R^2$, $R^3$, $R^4$, $R^5$, $R^6$, Y, $Y^1$ and $Y^2$ are each as defined, or performing the steps a) and b) in the reverse order, and subsequently, if X, $X^1$ and $X^2$ are not chloro or fluoro, reacting the resulting products with a compound of the general formula $R^9OH$, where $R^9$ is hydrogen or alkyl, or with an amine of the general formula $R^{10}NH_2$, where $R^{10}$ is hydrogen, cyano, alkyl, phenyl or sulfophenyl.

In a preferred embodiment of the preparation process according to the invention, 1-amino-8-hydroxynaphthalene-3,6-disulfonic acid is reacted with cyanuric chloride or cyanuric fluoride in a conventional manner, for example at a temperature between 0 and 40° C., preferably between 0 and 20° C., and at a pH between 0 and 8, preferably between 1 and 5, and the resulting reaction mixture is admixed with a mixture of an amino compound of the general formula Da, Ea or Fa and an amino compound of the general formula Ha, Ia or Ja and reacted therewith in a conventional manner, for example at a temperature between 0 and 60° C., preferably between 10 and 40° C., and at a pH between 1 and 8, preferably between 3 and 5.

The resulting diaminohalotriazine compounds are then finally reacted with a diazonium salt prepared from an amine of the general formula (3) in a well known manner to form a dye mixture according to the invention in a conventional manner, for example at a temperature between 10 and 50° C., preferably between 20 and 35° C., and at a pH between 3 and 7, preferably between 4 and 5.

The reaction of dyes of the general formulae 1 and 2 where the X radicals are each fluoro or chloro with alcohols of the general formula $R^9OH$ or amines of the general formula $R^{10}NH_2$ may be carried out in a conventional manner, for example at a temperature between 10 and 100° C., preferably between 40 and 80° C., and at a pH between 3 and 7, preferably between 4 and 5.

The separation from their synthesis solution of the chemically prepared dye mixtures of the invention can be effected according to generally known methods, for example either by precipitating from the reaction medium by means of electrolytes, for example sodium chloride or potassium chloride, or by evaporating or spray-drying the reaction solution, in which case this reaction solution may have a buffer substance added to it.

The dye mixtures of the invention have useful application properties. They are used for dyeing or printing hydroxyl- and/or carboxamido-containing materials, for example in the form of sheetlike structures, such as paper and leather or of films, for example composed of polyamide, or in bulk, as for example of polyamide and polyurethane, but especially for dyeing or printing these materials in fiber form. Similarly, the as-synthesized solutions of the dye mixtures of the invention, if appropriate after addition of a buffer substance and if appropriate after concentrating or diluting, can be used directly as liquid preparation for dyeing.

The present invention thus also relates to the use of the dye mixtures of the invention for dyeing or printing these materials, or rather to processes for dyeing or printing these materials in a conventional manner, by using a dye mixture of the invention as colorant. The materials are preferably employed in the form of fiber materials, especially in the form of textile fibers, such as woven fabrics or yarns, as in the form of hanks or wound packages.

Hydroxyl-containing materials are those of natural or synthetic origin, for example cellulose fiber materials or their regenerated products and polyvinyl alcohols. Cellulose fiber materials are preferably cotton, but also other vegetable fibers, such as linen, hemp, jute and ramie fibers; regenerated cellulose fibers are for example staple viscose and filament viscose.

Carboxamido-containing materials are for example synthetic and natural polyamides and polyurethanes, especially in the form of fibers, for example wool and other animal hairs, silk, leather, nylon-6,6, nylon-6, nylon-11 and nylon-4.

The dye mixtures of the invention can be applied to and fixed on the substrates mentioned, especially the fiber materials mentioned, by the application techniques known for water-soluble dyes, especially fiber-reactive dyes.

For instance, on cellulose fibers they produce by the exhaust method from a long liquor using various acid-binding agents and optionally neutral salts, such as sodium chloride or sodium sulfate, dyeings having very good color yields which are improved compared with the individual dyes of the general formulae 1 and 2. Application is preferably from an aqueous bath at temperatures between 40 and 105° C., optionally at a temperature of up to 130° C. under superatmospheric pressure, and optionally in the presence of customary dyeing auxiliaries. One possible procedure is to introduce the material into the warm bath and to gradually heat the bath to the desired dyeing temperature and to complete the dyeing process at that temperature. The neutral salts which accelerate the exhaustion of the dyes may also, if desired, only be added to the bath after the actual dyeing temperature has been reached.

The padding process likewise provides excellent color yields and very good color build-up on cellulose fibers, the dyes being allowed to become fixed on the material by batching at room temperature or at elevated temperature, for example at up to 60° C., by steaming or using dry heat in a conventional manner.

Similarly, the customary printing processes for cellulose fibers, which can be carried out either single-phase, for example by printing with a print paste comprising sodium bicarbonate or some other acid-binding agent and by subsequent steaming at 100 to 103° C., or two-phase, for example by printing with a neutral or weakly acidic print colour and subsequent fixation either by passing the printed material through a hot electrolyte-comprising alkaline bath or by overpadding with an alkaline electrolyte-comprising padding liquor with subsequent batching of the alkali-overpadded material or subsequent steaming or subsequent treatment with dry heat, produce strong prints with well-defined contours and a clear white ground. The appearance of the prints is not greatly affected by variations in the fixing conditions.

When fixing by means of dry heat in accordance with the customary thermofix processes, hot air from 1 20 to 200° C. is used. In addition to the customary steam at 101 to 103° C. it is also possible to use superheated steam and high-pressure steam at temperatures of up to 160° C.

The acid-binding agents which effect the fixation of the dyes of the dye mixtures of the invention on the cellulose fibers include for example water-soluble basic salts of the alkali metals and likewise alkaline earth metals of inorganic or organic acids or compounds which liberate alkali in the heat. Especially suitable are the alkali metal hydroxides and alkali metal salts of weak to medium inorganic or organic acids, the preferred alkali metal compounds being the sodium and potassium compounds. Such acid-binding agents include for example sodium hydroxide, potassium hydroxide, sodium carbonate, sodium bicarbonate, potassium carbonate, sodium-formate, sodium-dihydrogenphosphate, disodium hydrogenphosphate, sodium trichloroacetate, waterglass or trisodium phosphate.

The dye mixtures of the invention are notable for a high yield of fixation when applied to the cellulose fiber materials by dyeing or printing. The cellulose dyeings obtained following the customary aftertreatment by rinsing to remove unfixed dye portions exhibit excellent wetfastnesses, in particular since such unfixed dye portions are easily washed off on account of their good solubility in cold water.

The dyeings and prints obtainable with the dye mixtures of the invention have bright hues; especially the dyeings and prints on cellulose fiber materials have good lightfastness and very good wetfastnesses, such as wash, milling, water, seawater, crossdyeing and acidic and also alkaline perspiration fastness properties, also good fastness to pleating, hotpressing and rubbing.

Furthermore, the dye mixtures of the invention can also be used for the fiber-reactive dyeing of wool. Moreover, wool which has been given a nonfelting or low-felting finish (cf. for example H. Rath, Lehrbuch der Textilchemie, Springer-Verlag, 3rd Edition (1972), p. 295–299, especially the finish by the Hercosett process (p. 298); J. Soc. Dyers and Colourists 1972, 93–99, and 1975, 33–44) can be dyed with very good fastness properties.

The process of dyeing on wool is here carried out in a conventional manner from an acidic medium. For instance, acetic acid and/or ammonium sulfate or acetic acid and ammonium acetate or sodium acetate may be added to the dyebath to obtain the desired pH. To obtain a dyeing of acceptable levelness, it is advisable to add a customary leveling agent, for example on the basis of a reaction product of cyanuric chloride with 3 times the molar amount of an aminobenzenesulfonic acid and/or of an aminonaphthalenesulfonic acid or on the basis of a reaction product of for example stearylamine with ethylene oxide. For instance, the dye mixture of the invention is preferably subjected to the exhaust process initially from an acidic dyebath having a pH of about 3.5 to 5.5 under pH control and the pH is then, toward the end of the dyeing time, shifted into the neutral and optionally weakly alkaline range up to a pH of 8.5 to bring about, especially for very deep dyeings, the full reactive bond between the dyes of the dye mixtures of the invention and the fiber. At the same time, the dye portion not reactively bound is removed.

The procedure described herein also applies to the production of dyeings on fiber materials composed of other natural polyamides or of synthetic polyamides and polyurethanes. In general, the material to be dyed is introduced into the bath at a temperature of about 40° C., agitated therein for some time, the dyebath is then adjusted to the desired weakly acidic, preferably weakly acetic acid, pH and the actual dyeing is carried out at a temperature between 60 and 98° C. However, the dyeings can also be carried out at the boil or in sealed dyeing apparatus at temperatures of up to 106° C. Since the water solubility of the dye mixtures of the invention is very good, they can also be used with advantage in customary continuous dyeing processes. The color strength of the dye mixtures of the invention is very high.

The dye mixtures of the invention dye the materials mentioned, preferably fiber materials, in bright red to bluish red shades.

The examples hereinbelow serve to illustrate the invention. Parts and percentages are by weight, unless otherwise stated. Parts by weight relate to parts by volume as the kilogram relates to the liter. The compounds described in the examples in terms of a formula are indicated in the form of free acids, even if they are generated in the form of a salt by the indicated procedure; in general these dyes are prepared and isolated in the form of their salts, preferably sodium or potassium salts, and used for dyeing in the form of their salts. The starting compounds mentioned in the following examples, especially table examples, can similarly be used in the synthesis in the form of the free acid or in the form of their salts, preferably alkali metal salts, such as sodium or potassium salts.

EXAMPLE 1 a) 190.1 parts of cyanuric chloride are introduced into a suspension of 319.2 parts of 1-amino-8-naphthol-3,6-disulfonic acid in 1000 parts of water and 300 parts of ice with thorough stirring. The reaction batch is subsequently stirred for a further four hours at between 0 and 15° C. and (by means of sodium bicarbonate) at a pH between 1.0 and 3.5.

b) The solution of the dichlorotriazine compound of a) is combined with a pH 5.5 to 6.0 solution of 57.7 parts of aniline-3-sulfonic acid and 31.2 parts of N-(2-hydroxyethyl)-ethylenediamine in 640 parts of water. The pH is maintained at about 5 and the reaction mixture is heated to a temperature of 30 to 45° C. in the course of one to two hours.

c) The diazonium salt of the diazo component is prepared separately from the preceding steps a) and b), as follows: A pH 6.7 to 6.8 solution of 281 parts of 4-(β-sulfatoethylsulfonyl)-aniline in 750 parts of water is admixed with 69 parts of sodium nitrite. This mixture is added to a mixture of 800 parts of comminuted ice and 160 parts of 31% aqueous hydrochloric acid with thorough stirring. Stirring is continued at between 0 and 50° C. for a further hour and excess nitrous acid is then destroyed as usual with a little sulfamic acid.

d) The secondary condensation product prepared under b) is combined with the diazonium salt solution described under c). The coupling reaction is carried out by adjusting the strongly acidic reaction mixture to a pH of 4.5 to 5.0 by means of sodium carbonate at a temperature of about 15° C. and raising the temperature to 20 to 25° C. Stirring is continued at this pH and this temperature for some hours more until the coupling has ended.

e) The batch is then adjusted to a pH between 6.0 and 6.5 by means of sodium carbonate and clarified, and the filtrate is spray-dried.

This affords about 1400 parts of an electrolyte salt (predominantly sodium chloride and sodium sulfate) powder which is about 50% sodium salt of the compound of the formula (2a)

(2a)

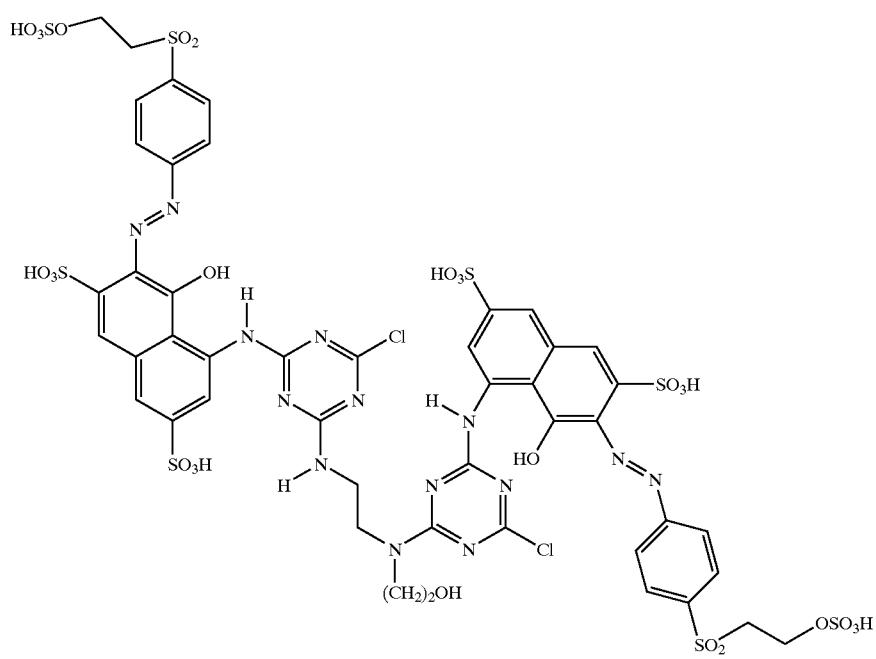

and about 28% sodium salt of the compound of the formula (1a)

(1a)

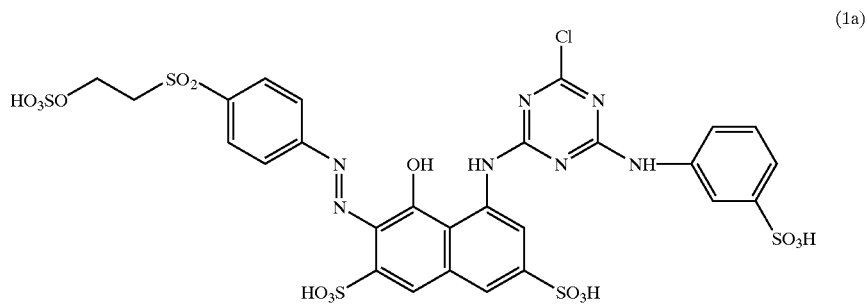

This mixture has very good dye properties and when applied by the application and fixing methods customary in the art for fiber-reactive dyes provides on the materials mentioned in the description, such as cellulose fiber materials, especially cotton and viscose, strong red dyeings and prints having very good fastness properties, especially very good wash, light, alkali, acid, water, seawater, perspiration and rub fastnesses. The dyeings are further notable for their high degree of fixation and good build-up on the cellulose materials. A particular advantage is the low staining of adjacent polyester fabric in continuous dyeing by the pad-steam process.

EXAMPLE 2

185 parts of cyanuric chloride and 319 parts of 1-amino-8-naphthol-3,6-disulfonic acid are rapidly added with thorough stirring to a mixture of 1000 parts of water and 400 parts of ice, and the batch is subsequently stirred for a further 3 to 5 hours or so at a pH between 1.5 and 2.0 and a temperature between 10 and 15° C. The pH is then adjusted to pH 4 to 7 by means of sodium carbonate. A diazonium salt solution according to Example 1c) is added dropwise while the pH is maintained between 4 and 7 by addition of sodium carbonate, and the solution of this primary condensation product is subsequently clarified by means of diatomaceous earth and filtration. 44 parts of 1,4-diaminobutane and 90 parts of the amine of the formula (Ib)

(1b)

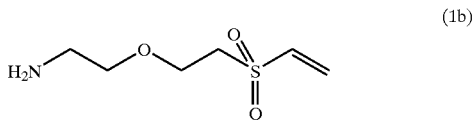

are added at 20 to 60° C. and the mixture is subsequently stirred at 10 to 14° C. and a pH of 4 to 7 for some hours, and the dye mixture of the invention is isolated from the filtrate by spray-drying.

This affords about 1300 parts of a dark red powder which, as well as electrolyte salts, contains about 44% of the sodium salt of the compound of the formula (2b)

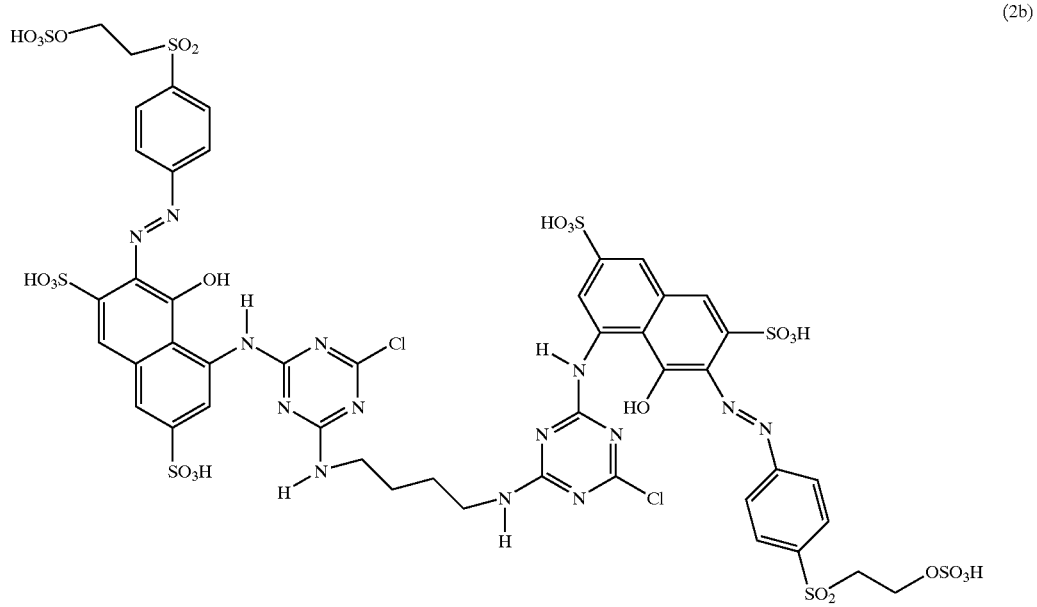

(2b)

and about 22% of the sodium salt of the compound of the formula (1b)

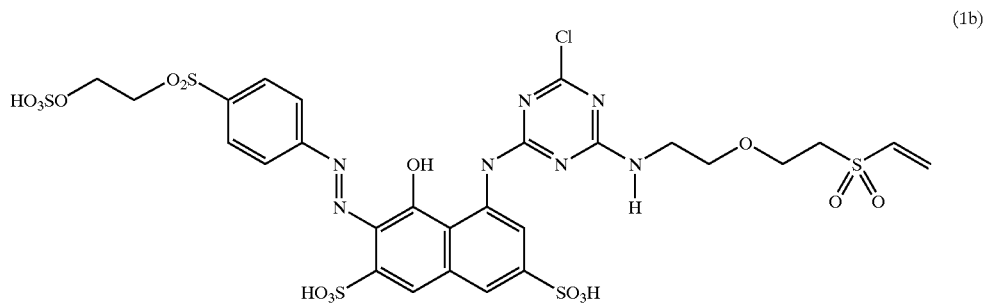

(1b)

This dye mixture according to the invention has very good application properties and when applied by the printing and dyeing methods customary in the art for fiber-reactive dyes affords, for example on cellulose fiber materials, strong red dyeings and prints having very good fabrication and use fastnesses, of which the lightfastness, the wash, perspiration or water and seawater fastnesses and also the resistance to chlorinated tap water may be mentioned in particular. The rate of fixation of this dye mixture of the invention on cellulose fiber materials is very high.

EXAMPLES 3 to 82

The examples hereinbelow describe further dye mixtures according to the invention. They may be prepared according to the invention either by mechanically mixing the individual dyes or else clinically, for example similarly to one of the above illustrative embodiments, using as starting components cyanuric chloride or cyanuric fluoride, 1-amino-8-naphthol-3,6-disulfonic acid and an amino compound of the general formula D, E or F and a further amino compound of the general formula H, I or J as second condensation components and a further amino compound as diazo component. These dye mixtures according to the invention likewise have very good application properties and when applied by the dying and printing methods customary in the art, preferably by the application and fixing methods customary in the art for fiber-reactive dyes, afford on the abovementioned materials, especially cellulose fiber materials, strong dyeings and prints having good fastness properties and particularly good staining behavior especially with regard to polyester in continuous dyeing by the pad-steam process and a good color build-up in the hue reported in the respective table example. The numerical ratios reported in the MR column indicate the weight ratio in percent of the dye or dyes of the general formula (1) to the dye or dyes of the general formula (2) for the dyes in the respective dye mixture.

| | | | Dye 1 | | | | Dye 2 SO$_2$Y$^1$ = | | | | | |
|---|---|---|---|---|---|---|---|---|---|---|---|---|
| Ex. | R$^1$ | R$^2$ | SO$_2$Y | X | A | G | R$^3$ = R$^5$ | R$^4$ = R$^6$ | SO$_2$Y$^2$ | X$^1$ = X$^2$ | B | MR |
| 3 | H | H | 4-β-Sulfatoethylsulfonyl | Cl | H | 4-Chlorophenyl | H | H | 4-β-Sulfato-ethylsulfonyl | Cl | N-(2-Hydroxy-ethyl)-ethylene-diamino | 70:30 |
| 4 | H | H | 4-β-Sulfatoethylsulfonyl | Cl | H | 4-Chlorophenyl | H | H | 4-β-Sulfato-ethylsulfonyl | Cl | N-(2-Hydroxy-ethyl)-ethylene-diamino | 60:40 |
| 5 | H | H | 4-β-Sulfatoethylsulfonyl | Cl | H | 4-Chlorophenyl | H | H | 4-β-Sulfato-ethylsulfonyl | Cl | N-(2-Hydroxy-ethyl)-ethylene-diamino | 50:50 |
| 6 | H | H | 4-β-Sulfatoethylsulfonyl | Cl | H | 4-Chlorophenyl | H | H | 4-β-Sulfato-ethylsulfonyl | Cl | N-(2-Hydroxy-ethyl)-ethylene-diamino | 40:60 |
| 7 | H | H | 4-β-Sulfatoethylsulfonyl | Cl | H | 4-Chlorophenyl | H | H | 4-β-Sulfato-ethylsulfonyl | Cl | N-(2-Hydroxy-ethyl)-ethylene-diamino | 75:25 |
| 8 | H | H | 4-β-Sulfatoethylsulfonyl | Cl | H | 4-Chlorophenyl | H | H | 4-β-Sulfato-ethylsulfonyl | Cl | 1,4-Diamino-1,4-tetramethylene | 70:30 |
| 9 | H | H | 4-β-Sulfatoethylsulfonyl | Cl | H | 4-Chlorophenyl | H | H | 4-β-Sulfato-ethylsulfonyl | Cl | 1,4-Diamino-1,4-tetramethylene | 60:40 |
| 10 | H | H | 4-β-Sulfatoethylsulfonyl | Cl | H | 4-Chlorophenyl | H | H | 4-β-Sulfato-ethylsulfonyl | Cl | 1,4-Diamino-1,4-tetramethylene | 50:50 |
| 11 | H | H | 4-β-Sulfatoethylsulfonyl | Cl | H | 4-Chlorophenyl | H | H | 4-β-Sulfato-ethylsulfonyl | Cl | 1,4-Diamino-1,4-tetramethylene | 40:60 |
| 12 | H | H | 4-β-Sulfatoethylsulfonyl | Cl | H | 4-Chlorophenyl | H | H | 4-β-Sulfato-ethylsulfonyl | Cl | 1,4-Diamino-1,4-tetramethylene | 75:25 |
| 13 | H | H | 4-β-Sulfatoethylsulfonyl | Cl | H | 4-β-Sulfato-ethylsulfonyl-aniline | H | H | 4-β-Sulfato-ethylsulfonyl | Cl | N-(2-Hydroxy-ethyl)-ethylene-diamino | 70:30 |
| 14 | H | H | 4-β-Sulfatoethylsulfonyl | Cl | H | 4-β-Sulfato-ethylsulfonyl-anilino | H | H | 4-β-Sulfato-ethylsulfonyl | Cl | N-(2-Hydroxy-ethyl)-ethylene-diamino | 60:40 |
| 15 | H | H | 4-β-Sulfatoethylsulfonyl | Cl | H | 4-β-Sulfato-ethylsulfonyl-anilino | H | H | 4-β-Sulfato-ethylsulfonyl | Cl | N-(2-Hydroxy-ethyl)-ethylene-diamino | 50:50 |
| 16 | H | H | 4-β-Sulfatoethylsulfonyl | Cl | H | 4-β-Sulfato-ethylsulfonyl-anilino | H | H | 4-β-Sulfato-ethylsulfonyl | Cl | N-(2-Hydroxy-ethyl)-ethylene-diamino | 40:60 |
| 17 | H | H | 4-β-Sulfatoethylsulfonyl | Cl | H | 4-β-Sulfato-ethylsulfonyl-anilino | H | H | 4-β-Sulfato-ethylsulf9nyl | Cl | N-(2-Hydroxy-ethyl)-ethylene-diamino | 75:25 |
| 18 | H | H | 4-β-Sulfatoethylsulfonyl | Cl | H | 4-β-Sulfato-ethylsulfonyl-anilino | H | H | 4-β-Sulfato-ethylsulfonyl | Cl | 1,4-Diamino-1,4-tetramethylene | 70:30 |
| 19 | H | H | 4-β-Sulfatoethylsulfonyl | Cl | H | 4-β-Sulfato-ethylsulfonyl-anilino | H | H | 4-β-Sulfato-ethylsulfonyl | Cl | 1,4-Diamino-1,4-tetramethylene | 60:40 |
| 20 | H | H | 4-β-Sulfatoethylsulfonyl | Cl | H | 4-β-Sulfato-ethylsulfonyl-anilino | H | H | 4-β-Sulfato-ethylsulfonyl | Cl | 1,4-Diamino-1,4-tetramethylene | 50:50 |
| 21 | H | H | 4-β-Sulfatoethylsulfonyl | Cl | H | 4-β-Sulfato-ethylsulfonyl-anilino | H | H | 4-β-Sulfato-ethylsulfonyl | Cl | 1,4-Diamino-1,4-tetramethylene | 40:60 |
| 22 | H | H | 4-β-Sulfatoethylsulfonyl | Cl | H | 4-β-Sulfato-ethylsulfonyl-anilino | H | H | 4-β-Sulfato-ethylsulfonyl | Cl | 1,4-Diamino-1,4-tetramethylene | 75:25 |
| 23 | H | H | 4-β-Sulfatoethylsulfonyl | Cl | Me | 2-(β-Sulfato-ethylsulfonyl)-ethylene | H | H | 4-β-Sulfato-ethylsulfonyl | Cl | N-(2-Hydroxy-ethyl)-ethylene-diamino | 70:30 |
| 24 | H | H | 4-β-Sulfatoethylsulfonyl | Cl | H | 2-(β-Sulfato-ethylsulfonyl)-ethylene | H | H | 4-β-Sulfato-ethylsulfonyl | Cl | N-(2-Hydroxy-ethyl)-ethylene-diamino | 60:40 |
| 25 | H | H | 4-β-Sulfatoethylsulfonyl | Cl | Me | 2-(β-Sulfato-ethylsulfonyl)-ethylene | H | H | 4-β-Sulfato-ethylsulfonyl | Cl | 1,4-Diamino-1,4-tetramethylene | 50:50 |
| 26 | H | H | 4-β-Sulfatoethylsulfonyl | Cl | Ph | 2-(β-Sulfato-ethylsulfonyl)-ethylene | H | H | 4-β-Sulfato-ethylsulfonyl | Cl | N-(2-Hydroxy-ethyl)-ethylene-diamino | 40:60 |
| 27 | H | H | 4-β-Sulfatoethylsulfonyl | Cl | Et | 2-(β-Sulfato-ethylsulfonyl)-ethylene | H | H | 4-β-Sulfato-ethylsulfonyl | Cl | 1,4-Diamino-1,4-tetramethylene | 75:25 |
| 28 | H | H | 4-β-Sulfatoethylsulfonyl | Cl | H | 3-(β-Sulfato-ethylsulfonyl)-propylene | H | H | 4-β-Sulfato-ethylsulfonyl | Cl | N-(2-Hydroxy-ethyl)-ethylene-diamino | 70:30 |

-continued

| | | | Dye 1 | | | | | | Dye 2 SO₂Y¹ = | | | | |
|---|---|---|---|---|---|---|---|---|---|---|---|---|---|
| Ex. | R¹ | R² | SO₂Y | X | A | G | R³ = R⁵ | R⁴ = R⁶ | SO₂Y² | X¹ = X² | B | MR |
| 29 | H | H | 4-β-Sulfatoethylsulfonyl | Cl | Me | 3-(β-Sulfato-ethylsulfonyl)-propylene | H | H | 4-β-Sulfato-ethylsulfonyl | Cl | 1,4-Diamino-1,4-tetramethylene | 60:40 |
| 30 | H | H | 4-β-Sulfatoethylsulfonyl | Cl | H | 3-(β-Sulfato-ethylsulfonyl)-propylene | H | H | 4-β-Sulfato-ethylsulfonyl | Cl | 1,4-Diamino-1,4-tetramethylene | 50:50 |
| 31 | H | H | 4-β-Sulfatoethylsulfonyl | Cl | Ph | 3-(β-Sulfato-ethylsulfonyl)-propylene | H | H | 4-β-Sulfato-ethylsulfonyl | Cl | N-(2-Hydroxy-ethyl)-ethylene-diamino | 40:60 |
| 32 | H | H | 4-β-Sulfatoethylsulfonyl | Cl | H | 3-(β-Sulfato-ethylsulfonyl)-propylene | H | H | 4-β-Sulfato-ethylsulfonyl | Cl | 1,5-Diamino-1,5-pentamethylene | 50:50 |
| 33 | 2-OMe | H | 5-β-Sulfatoethylsulfonyl | Cl | Me | 2-(β-Sulfato-ethylsulfonyl)-ethylene | H | H | 4-β-Sulfato-ethylsulfonyl | Cl | N-(2-Hydroxy-ethyl)-ethylene-diamino | 70:30 |
| 34 | 2-OMe | H | 5-β-Sulfatoethylsulfonyl | Cl | Ph | 2-(β-Sulfato-ethylsulfonyl)-ethylene | H | H | 4-β-Sulfato-ethylsulfonyl | Cl | N-(2-Hydroxy-ethyl)-ethylene-diamino | 60:40 |
| 35 | 2-OMe | H | 5-β-Sulfatoethylsulfonyl | Cl | H | 2-(β-Sulfato-ethylsulfonyl)-ethylene | H | H | 4-β-Sulfato-ethylsulfonyl | Cl | 1,4-Diamino-1,4-tetramethylene | 50:50 |
| 36 | 2-OMe | H | 5-β-Sulfatoethylsulfonyl | Cl | Me | 2-(β-Sulfato-ethylsulfonyl)-ethylene | H | H | 4-β-Sulfato-ethylsulfonyl | Cl | N-(2-Hydroxy-ethyl)-ethylene-diamino | 40:60 |
| 37 | 2-OMe | H | 5-β-Sulfatoethylsulfonyl | Cl | H | 2-(β-Sulfato-ethylsulfonyl)-ethylene | H | H | 4-β-Sulfato-ethylsulfonyl | Cl | 1,4-Diamino-1,4-tetramethylene | 75:25 |
| 38 | 2-OMe | H | 5-β-Sulfatoethylsulfonyl | Cl | H | 3-(β-Sulfato-ethylsulfonyl)-propylene | H | H | 4-β-Sulfato-ethylsulfonyl | Cl | N-(2-Hydroxy-ethyl)-ethylene-diamino | 70:30 |
| 39 | 2-OMe | H | 5-β-Sulfatoethylsulfonyl | Cl | H | 2-(β-Sulfato-ethylsulfonyl)-ethylene | H | H | 4-β-Sulfato-ethylsulfonyl | Cl | 1,4-Diamino-1,4-tetramethylene | 60:40 |
| 40 | 2-OMe | H | 5-β-Sulfatoethylsulfonyl | Cl | Et | 3-(β-Sulfato-ethylsulfonyl)-propylene | H | H | 4-β-Sulfato-ethylsulfonyl | Cl | 1,4-Diamino-1,4-tetramethylene | 50:50 |
| 41 | 2-OMe | H | 5-β-Sulfatoethylsulfonyl | Cl | Me | 2-(β-Sulfato-ethylsulfonyl)-ethylene | H | H | 4-β-Sulfato-ethylsulfonyl | Cl | N-(2-Hydroxy-ethyl)-ethylene-diamine | 40:60 |
| 42 | 2-OMe | H | 5-β-Sulfatoethylsulfonyl | Cl | H | 3-(β-Sulfato-ethylsulfonyl)-propylene | H | H | 4-β-Sulfato-ethylsulfonyl | Cl | 1,5-Diamino-1,5-penta-methylene | 50:50 |
| 43 | 2-OMe | H | 5-β-Sulfatoethylsulfonyl | Cl | H | 2-(β-Sulfato-ethylsulfonyl)-ethylene | 2-OMe | H | 4-β-Sulfato-ethylsulfonyl | Cl | N-(2-Hydroxy-ethyl)-ethylene-diamino | 70:30 |
| 44 | 2-OMe | H | 5-βSulfatoethylsulfonyl | Cl | H | 2-(β-Sulfato-ethylsulfonyl)-ethylene | 2-OMe | H | 4-β-Sulfato-ethylsulfonyl | Cl | N-(2-Hydroxy-ethyl)-ethylene-diamino | 60:40 |
| 45 | 2-OMe | H | 5-β-Sulfatoethylsulfonyl | Cl | H | 2-(β-Sulfato-ethylsulfonyl)-ethylene | 2-OMe | H | 4-β-Sulfato-ethylsulfonyl | Cl | 1,4-Diamino-1,4-tetramethylene | 50:50 |
| 46 | 2-OMe | H | 5-β-Sulfatoethylsulfonyl | Cl | Me | 2-(β-Sulfato-ethylsulfonyl)-ethylene | 2-OMe | H | 4-β-Sulfato-ethylsulfonyl | Cl | N-(2-Hydroxy-ethyl)-ethylene-diamino | 40:60 |
| 47 | 2-OMe | H | 5-β-Sulfatoethylsulfonyl | Cl | H | 2-(β-Sulfato-ethylsulfonyl)-ethylene | 2-OMe | H | 4-β-Sulfato-ethylsulfonyl | Cl | 1,4-Diamino-1,4-tetramethylene | 75:25 |
| 48 | 2-OMe | H | 5-β-Sulfatoethylsulfonyl | Cl | H | 3-(β-Sulfato-ethylsulfonyl)-propylene | 2-OMe | H | 4-β-Sulfato-ethylsulfonyl | Cl | N-(2-Hydroxy-ethyl)-ethylene-diamino | 70:30 |
| 49 | 2-OMe | H | 5-β-Sulfatoethylsulfonyl | Cl | H | 2-(β-Sulfato-ethylsulfonyl)-ethylene | 2-OMe | H | 4-β-Sulfato-ethylsulfonyl | Cl | 1,4-Diamino-1,4-tetramethylene | 60:40 |
| 50 | 2-OMe | H | 5-β-Sulfatoethylsulfonyl | Cl | Me | 1-Amino-3-(β-sulfatoethyl-sulfonyl)propylene | 2-OMe | H | 4-β-Sulfato-ethylsulfonyl | Cl | 1,4-Diamino-1,4-tetramethylene | 50:50 |
| 51 | 2-OMe | H | 5-β-Sulfatoethylsulfonyl | Cl | Me | 2-(β-Sulfato-ethylsulfonyl)-ethylene | 2-OMe | H | 4-β-Sulfato-ethylsulfonyl | Cl | N-(2-Hydroxy-ethyl)-ethylene-diamino | 40:60 |
| 52 | 2-OMe | H | 5-β-Sulfatoethylsulfonyl | Cl | H | 3-(β-Sulfato-ethylsulfonyl)-propylene | 2-OMe | H | 4-β-Sulfato-ethylsulfonyl | Cl | 1,4-Diamino-1-methyl-tetramethylene | 50:50 |

-continued

| | | | Dye 1 | | | | Dye 2 SO$_2$Y$^1$ = | | | | | |
|---|---|---|---|---|---|---|---|---|---|---|---|---|
| Ex. | R$^1$ | R$^2$ | SO$_2$Y | X | A | G | R$^3$ = R$^5$ | R$^4$ = R$^6$ | SO$_2$Y$^2$ | X$^1$ = X$^2$ | B | MR |
| 53 | H | H | 4-β-Sulfatoethylsulfonyl | F | H | 4-β-Sulfato-ethyl-sulfonyl-anilino | H | H | 4-β-Sulfato-ethylsulfonyl | F | N-(2-Hydroxy-ethyl)-ethylene-diamino | 70:30 |
| 54 | H | H | 4-β-Sulfatoethylsulfonyl | F | H | 4-β-Sulfato-ethyl-sulfonyl-anilino | H | H | 4-β-Sulfato-ethylsulfonyl | F | N-(2-Hydroxy-ethyl)-ethylene-diamino | 60:40 |
| 55 | H | H | 4-β-Sulfatoethylsulfonyl | F | H | 4-β-Sulfato-ethyl-sulfonyl-anilino | H | H | 4-β-Sulfato-ethylsulfonyl | F | N-(2-Hydroxy-ethyl)-ethylene-diamino | 50:50 |
| 56 | H | H | 4-β-Sulfatoethylsulfonyl | F | H | 4-β-Sulfato-ethyl-sulfonyl-anilino | H | H | 4-β-Sulfato-ethylsulfonyl | F | N-(2-Hydroxy-ethyl)-ethylene-diamino | 40:60 |
| 57 | H | H | 4-β-Sulfatoethylsulfonyl | F | H | 4-β-Sulfato-ethyl-sulfonyl-anilino | H | H | 4-β-Sulfato-ethylsulfonyl | F | N-(2-Hydroxy-ethyl)-ethylene-diamino | 75:25 |
| 58 | H | H | 4-β-Sulfatoethylsulfonyl | F | H | 4-β-Sulfato-ethyl-sulfonyl-anilino | H | H | 4-β-Sulfato-ethylsulfonyl | F | 1,4-Diamino-1,4-tetramethylene | 70:30 |
| 59 | H | H | 4-β-Sulfatoethylsulfonyl | F | H | 4-β-Sulfato-ethyl-sulfonyl-anilino | H | H | 4-β-Sulfato-ethylsulfonyl | F | 1,4-Diamino-1,4-tetramethylene | 60:40 |
| 60 | H | H | 4-β-Sulfatoethylsulfonyl | F | H | 4-β-Sulfato-ethyl-sulfonyl-anilino | H | H | 4-β-Sulfato-ethylsulfonyl | F | 1,4-Diamino-1,4-tetramethylene | 50:50 |
| 61 | H | H | 4-β-Sulfatoethylsulfonyl | F | H | 4-β-Sulfato-ethyl-sulfonyl-anilino | H | H | 4-β-Sulfato-ethylsulfonyl | F | 1,4-Diamino-1,4-tetramethylene | 40:60 |
| 62 | H | H | 4-β-Sulfatoethylsulfonyl | F | H | 4-β-Sulfato-ethyl-sulfonyl-anilino | H | H | 4-β-Sulfato-ethylsulfonyl | F | 1,4-Diamino-1,4-tetramethylene | 75:25 |
| 63 | H | H | 4-β-Sulfatoethylsulfonyl | Cl | | Morpholino | H | H | 4-β-Sulfato-ethylsulfonyl | F | N-(2-Hydroxy-ethyl)-ethylene-diamino | 60:30 |
| 64 | H | H | 4-β-Sulfatoethylsulfonyl | Cl | | Morpholino | H | H | 4-β-Sulfato-ethylsulfonyl | Cl | N-(2-Hydroxy-ethyl)-ethylene-diamino | 60:40 |
| 65 | H | H | 4-β-Sulfatoethylsulfonyl | F | | Morpholino | H | H | 4-β-Sulfato-ethylsulfonyl | Cl | N-(2-Hydroxy-ethyl)-ethylene-diamino | 50:50 |
| 66 | H | H | 4-β-Sulfatoethylsulfonyl | F | | Morpholino | H | H | 4-β-Sulfato-ethylsulfonyl | F | N-(2-Hydroxy-ethyl)-ethylene-diamino | 50:50 |
| 67 | H | H | 4-β-Sulfatoethylsulfonyl | Cl | | Morpholino | H | H | 4-β-Sulfato-ethylsulfonyl | Cl | 2,2'-Diamino-diethylether | 50:50 |
| 68 | H | H | 4-β-Sulfatoethylsulfonyl | Cl | | Morpholino | H | H | 4-β-Sulfato-ethylsulfonyl | Cl | 1,4-Diamino-1,4-tetramethylene | 70:30 |
| 69 | H | H | 4-β-Sulfatoethylsulfonyl | F | | Morpholino | H | H | 4-β-Sulfato-ethylsulfonyl | F | 1,6-Diamino-hexamethylene | 60:40 |
| 70 | H | H | 4-β-Sulfatoethylsulfonyl | Cl | | Morpholino | H | H | 4-β-Sulfato-ethylsulfonyl | Cl | 1,5-Diamino-pentamethylene | 50:50 |
| 71 | H | H | 4-β-Sulfatoethylsulfonyl | Cl | | Morpholino | H | H | 4-β-Sulfato-ethylsulfonyl | Cl | 1,2-Diamino-ethylene | 40:60 |
| 72 | H | H | 4-β-Sulfatoethylsulfonyl | Cl | | Morpholino | H | H | 4-β-Sulfato-ethylsulfonyl | Cl | 1,4-Diamino-1,4-tetramethylene | 75:25 |
| 73 | H | H | 4-β-Sulfatoethylsulfonyl | Cl | H | 3-Sulfoanilino | H | H | 4-β-Sulfato-ethylsulfonyl | Cl | N-(2-Hydroxy-ethyl)-ethylene-diamino | 70:30 |
| 74 | H | H | 4-β-Sulfatoethylsulfonyl | Cl | H | 3-Sulfoanilino | H | H | 4-β-Sulfato-ethylsulfonyl | Cl | N-(2-Hydroxy-ethyl)-ethylene-diamino | 60:40 |
| 75 | H | H | 4-β-Sulfatoethylsulfonyl | Cl | H | 3-Sulfoanilino | H | H | 4-β-Sulfato-ethylsulfonyl | Cl | N-(2-Hydroxy-ethyl)-ethylene-diamino | 50:50 |
| 76 | H | H | 4-β-Sulfatoethylsulfonyl | Cl | H | 3-Sulfoanilino | H | H | 4-β-Sulfato-ethylsulfonyl | Cl | N-(2-Hydroxy-ethyl)-ethylene-diamino | 40:60 |
| 77 | H | H | 4-β-Sulfatoethylsulfonyl | Cl | H | 3-Sulfoanilino | H | H | 4-β-Sulfato-ethylsulfonyl | Cl | N-(2-Hydroxy-ethyl)-ethylene-diamino | 75:25 |
| 78 | H | H | 4-β-Sulfatoethylsulfonyl | Cl | H | 3-Sulfoanilino | H | H | 4-β-Sulfato-ethylsulfonyl | Cl | 1,4-Diamino-1,4-tetramethylene | 70:30 |
| 79 | H | H | 4-β-Sulfatoethylsulfonyl | F | H | 3-Sulfoanilino | H | H | 4-β-Sulfato-ethylsulfonyl | F | 1,4-Diamino-1,4-tetramethylene | 60:40 |
| 80 | H | H | 4-β-Sulfatoethylsulfonyl | F | H | 3-Sulfoanilino | H | H | 4-β-Sulfato-ethylsulfonyl | F | 1,4-Diamino-1,4-tetramethylene | 50:50 |
| 81 | H | H | 4-β-Sulfatoethylsulfonyl | NH$_2$ | H | 3-Sulfoanilino | H | H | 4-β-Sulfato-ethylsulfonyl | Cl | 1,4-Diamino-1,4-tetramethylene | 40:60 |

-continued

| | | Dye 1 | | | | | | Dye 2 $SO_2Y^1 =$ | | | |
| --- | --- | --- | --- | --- | --- | --- | --- | --- | --- | --- | --- |
| Ex. | $R^1$ | $R^2$ | $SO_2Y$ | X | A | G | $R^3 = R^5$ $R^4 = R^6$ | $SO_2Y^2$ | $X^1 = X^2$ | B | MR |
| 82 | H | H | 4-β-Sulfatoethylsulfonyl | NH—CN | H | 3-Sulfoanilino | H H | 4-β-Sulfato-ethylsulfonyl | Cl | 1,4-Diamino-1,4-tetramethylene | 75:25 |

EXAMPLE 83
(Dyeing Prescription I)

2 parts of the dye mixture obtained according to Example 1 are dissolved in 400 parts of water and 1500 parts of a solution containing 53 g of sodium chloride per liter are added. This dyebath is entered at 40° C. with 100 parts of cotton fabric. After 45 minutes 100 parts of a solution containing 16 g of sodium hydroxide and 20 g of calcined sodium carbonate per liter are added. The temperature of the dyebath is maintained at 40° C. for a further 45 minutes. Thereafter, the dyed material is rinsed, soaped off at the boil with a nonionic detergent for a quarter of an hour, rinsed once more and dried.

EXAMPLE 84
(Dyeing Prescription II)

2 parts of the dye mixture obtained according to Example 1 are dissolved in 400 parts of water and 1500 parts of a solution containing 53 g of sodium chloride per liter are added. This dyebath is entered at 35° C. with 100 parts of cotton fabric. After 20 minutes 100 parts of a solution containing 16 g of sodium hydroxide and 20 g of calcined sodium carbonate per liter are added. The temperature of the dyebath is maintained at 35° C. for a further 15 minutes. Thereafter, the temperature is raised to 60° C. in the course of 20 minutes and maintained at 60° C. for a further 35 minutes. Thereafter, the dyed material is rinsed, soaped off at the boil with a nonionic detergent for a quarter of an hour, rinsed once more and dried.

What is claimed is:

1. A dye mixture comprising one or more azo dyes of the general formula (1) and one or more azo dyes of the general formula (2)

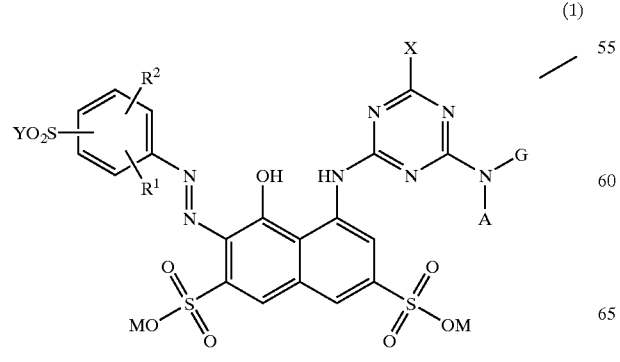

(1)

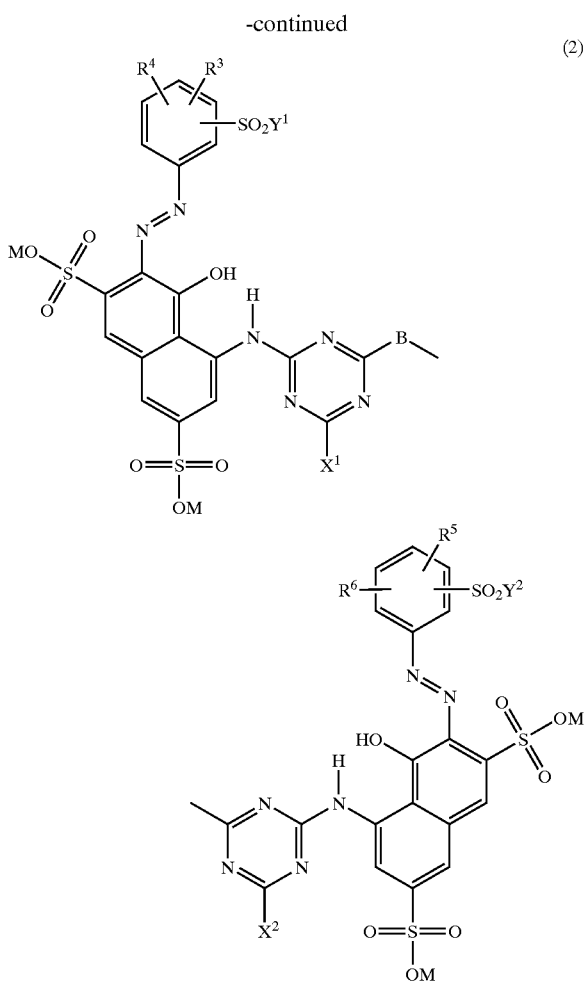

where

M is an alkali metal, an ammonium or the equivalent of an alkaline earth metal;

X, $X^1$ and $X^2$ are independently fluoro, chloro, alkoxy, hydroxyl, cyanamide, amino, anilino, sulfoanilino or alkylamino;

Y, $Y^1$ and $Y^2$ are independently ethenyl or a grouping of the formula —$CH_2CH_2Z$, where Z is an alkali-eliminable grouping;

$R^2$, $R^2$, $R^3$, $R^4$, $R^5$ and $R^6$ are independently hydrogen, alkyl, alkoxy, sulfo, hydroxyl, cyano, chloro or bromo;

B is an alkylenediamino bridge of the general formula D or E or F

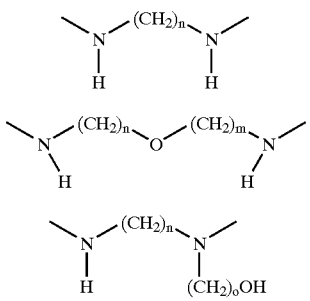

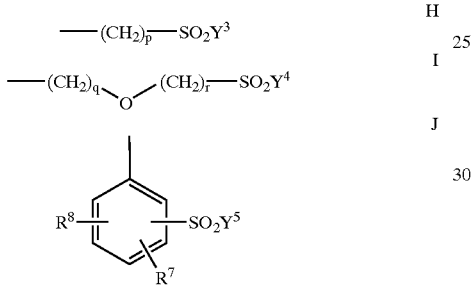

where n, m and o are independently from 1 to 8;
A and G combine to form a morpholine or piperazine radical; or
A is hydrogen, substituted ($C_1$–$C_4$)-alkyl phenyl or phenyl substituted by alkyl, alkoxy, sulfo, hydroxyl, cyano, chloro or bromo; and
G has one of the meanings of A or is a fiber-reactive radical of the general formula H, I or J

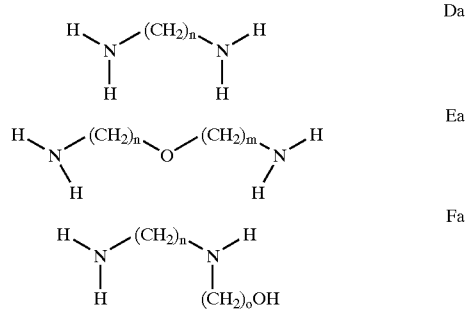

where p, q and r are independently from 1 to 4;
$Y^3$, $Y^4$ and $Y^5$ independently have one of the meanings of $Y^1$; and
$R^7$ and $R^8$ are independently hydrogen, alkyl, alkoxy, sulfo, hydroxyl, cyano, chloro or bromo.

2. A dye mixture as claimed in claim 1, wherein $R^1$ to $R^1$ are each hydrogen, the groups —$SO_2Y$, —$SO_2Y^1$ and —$SO_2Y^2$ are disposed para relative to the diazo group and Y, $Y^1$ and $Y^2$ are each ethenyl or β-sulfatoethyl, A is hydrogen, methyl or phenyl, X, $X^1$ and $X^2$ are each fluoro or chloro, and G is 2-(β-sulfatoethylsulfonyl)-ethyl, 4-(β-sulfatoethylsulfonyl)-phenyl or is a radical of the general formula I with q=r=2.

3. A dye mixture as claimed in claim 1, which comprises one or more azo dyes of the general formula (1) and one or more azo dyes of the general formula (2) in a blend ratio of 90:10% by weight to 10:90% by weight.

4. A dye mixture as claimed in claim 2, which comprises one or more azo dyes of the general formula (1) and one or more azo dyes of the general formula (2) in a blend ratio of 70:30% by weight to 30:70% by weight.

5. A dye mixture as claimed in claim 1, which comprises one or more azo dyes of the general formula (1) and one or more azo dyes of the general formula (2) in a blend ratio of 65:35% by weight to 35:65% by weight.

6. A process for preparing a dye mixture as claimed in claim 1, which comprises mechanically mixing the dyes of the general formula (1) and (2).

7. The process for printing on a material which comprises contacting the dye mixture as claimed in claim 1 with a hydroxy and/or carboxamido containing material.

8. A process for preparing a dye mixture as claimed in claim 1, wherein $R^1$ is as defined in claim 1 and $R^2$ to $R^6$ have the same meaning as $R^1$ and Y is as defined in claim 1 and $Y^1$ and $Y^2$ have the same meaning as Y, which comprises reacting 1-amino-8-hydroxynaphthalene-3,6-disulfonic acid with cyanuric chloride or cyanuric fluoride, with a mixture of one or more amines of the general formula Da, Ea or Fa

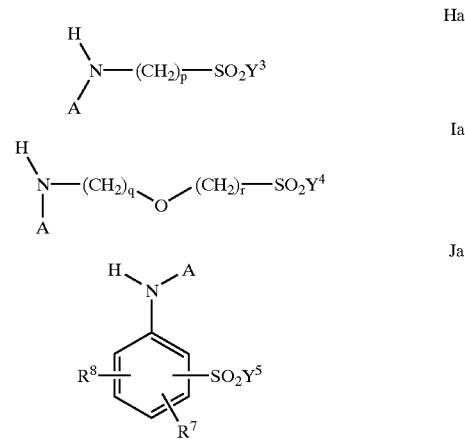

where n, m and o are each as defined in claim 1, and one or more amines of the general formula Ha, Ia, Ja or morpholine,

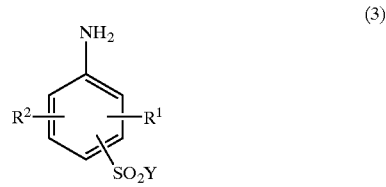

where p, r, A, $Y^3$, $Y^4$, $Y^5$, $R^7$ and $R^8$ are each as defined in claim 1, (b) subsequently with a mixture of diazonium salts of the amines of the general formulae (3), (4) and (5)

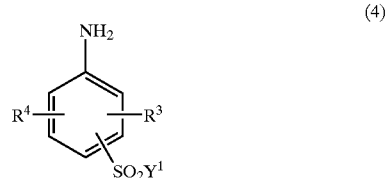

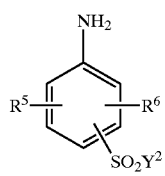
(5)

where $R^1, R^2, R^2, R^3, R^4, R^5, R^6, Y, Y^1$ and $Y^2$ are each as defined in claim 1, or performing the steps (a) and (b) in the reverse order, and subsequently, if X, $X^1$ and $X^2$ are not chloro or fluoro, reacting the resulting products with a compound of the general formula $R^9OH$, where $R^9$ is hydrogen or alkyl or with an amine of the general formala $R^{10}NH_2$, wherein $R^{10}$ is hydrogen, cyano, alkyl, phenyl or sulfophenyl.

9. A process for dyeing a material which comprises applying the dye mixture as claimed in claim 1 onto said material.

10. The process as claimed in claim 9, wherein said material is a textile fiber material.

11. The process as claimed in claim 9, wherein said material is a hydroxy containing material.

12. The process claimed in claim 9 wherein said material is a carboxamido containing material.

* * * * *

UNITED STATES PATENT AND TRADEMARK OFFICE
CERTIFICATE OF CORRECTION

PATENT NO. : 6,391,066 B1
DATED : May 21, 2002
INVENTOR(S) : Steckelberg et al.

It is certified that error appears in the above-identified patent and that said Letters Patent is hereby corrected as shown below:

Column 22,
Line 63, delete "$R^2, R^2$" and insert -- $R^1, R^2$ --.

Column 23,
Line 18, delete "substituted" and insert -- unsubstituted --.
Line 41, delete "$R^1$ to $R^1$" and insert -- $R^1$ to $R^8$ --.

Signed and Sealed this

Twenty-fourth Day of September, 2002

Attest:

*Attesting Officer*

JAMES E. ROGAN
*Director of the United States Patent and Trademark Office*